Sept. 16, 1969      A. W. JOHNSTON      3,467,128
REVOLVING LIQUID VALVE
Filed June 13, 1966
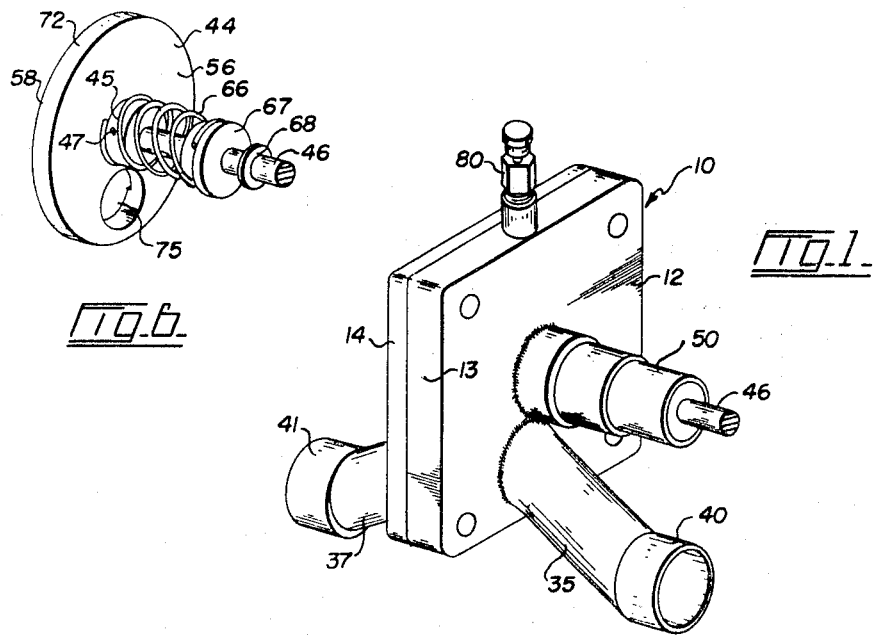
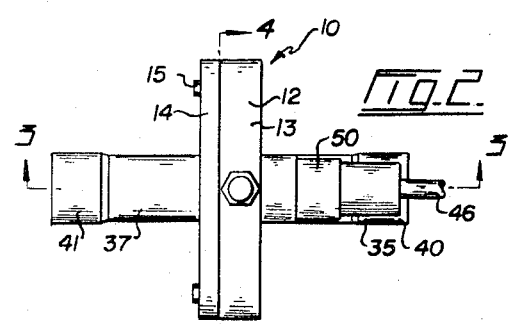
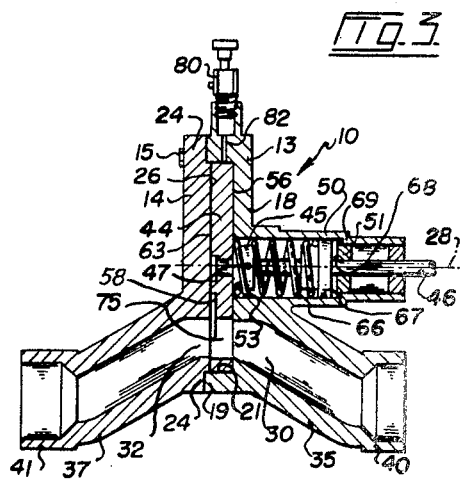
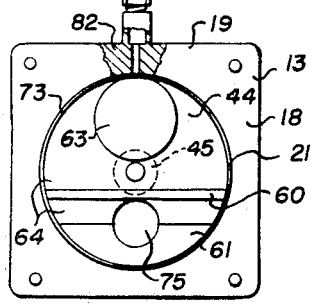
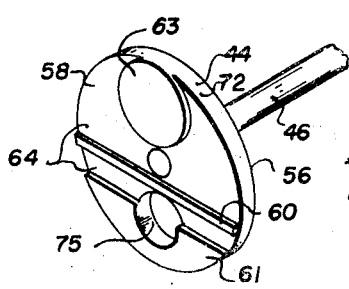
INVENTOR
ALEXANDER W. JOHNSTON United States Patent Office 3,467,128
Patented Sept. 16, 1969

3,467,128
REVOLVING LIQUID VALVE
Alexander W. Johnston, 5550 Blenheim St.,
Vancouver, British Columbia, Canada
Filed June 13, 1966, Ser. No. 557,304
Int. Cl. F16k *3/26, 31/04, 31/46*
U.S. Cl. 137—171                                    11 Claims

ABSTRACT OF THE DISCLOSURE

A revolving liquid valve including a valve plate rotatably mounted in a chamber, said plate having a control port therethrough positioned to move into and out of registry with aligned entry and exit ports formed in opposite walls of the chamber when the plate is rotated.

---

This invention relates to a liquid valve having a rotatable element for shutting off and permitting controlled flow of liquid through a pipe to which the valve is connected.

Although this valve may be used for any desired purpose, it was developed primarily for heating systems, said valve being thermostatically controlled to regulate the flow of hot water to a heating system. The valve can be operated manually and/or by a suitable power unit, such as an electric motor.

This valve is connected to a pipe in order to control the flow of liquid therethrough. The valve according to the present invention comprises a chamber in a valve body and having first and second opposed spaced-apart walls, a valve plate or element rotatably mounted in said chamber and having opposite faces one of which slidably bears against said second wall, a stem or shaft connected to the valve plate at an axis of rotation thereof and extending out of the chamber through the first wall and through a seal, aligned entry and exit ports respectively in the first and second walls and offset from said stem, and a control port through the valve plate positioned to move into and out of registry with the entry and exit ports when the plate is rotated. The control port in the valve plate preferably is larger than the entry port.

Some of the advantages of the present liquid valve are as follows:

(a) It allows full free flow of liquid when the valve is completely open.

(b) It gradually changes from a fully closed position to a fully open position, and back again during rotation of the valve plate, and there is a minimum resistance to the turning of said plate by high pressure liquid at the entry port.

(c) It provides complete shut-off of liquids under high or low pressure, and this pressure assists in the sealing action of the valve.

(d) There is very little likelihood of clogging or jamming of the valve since there is a wiping and flushing action during rotation of the valve plate.

(e) Any foreign particles, such as copper shavings and the like, caught in the valve are usually cut by the rotating action of the valve plate or flushed through the valve so that these particles do not interfere with proper operation of the valve.

(f) The seating of the valve plate is not constantly or directly exposed to water flow and, therefore, the valve is not subject to wire drawing.

(g) The valve plate is always rotated in the same direction in order to close and open the valve so that when it is motor driven, there is no need for extra gears, cams, forks and the like in order to reverse the rotation of the plate as are required by the valves of the prior art for this purpose.

An example of a valve constructed in accordance with the present invention is illustrated in the accompanying drawings, in which, FIGURE 1 is a perspective view of the liquid valve, FIGURE 2 is a plan view of the valve, FIGURE 3 is a longitudinal section taken on the line 3—3 of FIGURE 2, FIGURE 4 is a cross section taken on the line 4—4 of FIGURE 2, FIGURE 5 is a perspective view of the valve plate removed from the valve, showing one face thereof, and FIGURE 6 is a perspective view of the valve plate showing the opposite face thereof.

Referring to the drawings, 10 is a revolving liquid valve made up of a valve body 12 which is preferably in two sections 13 and 14 removably held together in any suitable manner, such as by means of screws 15. In this example, section 13 consists of a wall 18 with a flange or wall 19 projecting outwardly therefrom and forming a chamber 21. Section 14 is in the form of a cover or wall 24 which is spaced from and opposed to wall 18, said wall 24 bearing against flange 19 to close chamber 21. The cover section or wall 24 is preferably formed with a flat projection 26 thereon fitting within wall or flange 19 of chamber 21, said projection forming the effective inner surface of wall 24. Chamber 21 has a transverse axis 28 centrally thereof. An entry port 30 is formed in wall 18 to one side of the chamber axis 28, and an exit port 32 is formed in wall 24 in line with the entry port. An inlet pipe 35 is connected to wall 18 of the valve body over entry port 30 and is inclined away from axis 28, see FIGURE 3. Similarly, an outlet pipe 37 is connected to wall 24 over exit port 32, and is inclined away therefrom in substantially the same general plane as the inlet pipe. Pipes 35 and 37 have enlargements 40 and 41 at their outer ends for seating pipes of a water system to be controlled by this valve.

A valve plate or element 44 is rotatably mounted in chamber 21. In this example, plate 44 has a hub 45 projecting outwardly therefrom for receiving an end of a stem or shaft 46, said stem or shaft being connected to the hub by a shear pin 47. A housing 50 integrally connected to wall 18 has suitable bearings or sleeves 51 therein for supporting stem 46. Housing 50 fits over an opening 53 in wall 18 through which hub 45 projects, see FIGURE 3. It will be noted that the axis of valve plate 44 and stem 46 coincides with axis 28 of chamber 21.

Valve plate 44 has a plane face 56 slidably bearing against or just clearing the inner surface of wall 18, and an opposite face 58 either bearing directly or indirectly against the inner surface of projection 26 of wall 24. In this example, face 58 does not bear directly against the effective inner surface of wall 24, but said face 58 includes spaced apart wipers 60 and 61 projecting outwardly therefrom and extending across plate 44. A circular boss 63 forms part of and projects outwardly from face 58 spaced on the opposite side of axis 28 from wipers 60 and 61, see FIGURE 5. These wipers and the boss form spaces 64 around themselves over the surface of plate face 58. Boss 63 is larger than exit port 32. Wipers 60 and 61 and boss 63 slidably bear against the inner surface 26 of wall 24, and it is preferable resiliently to urge valve plate 44 towards and against said wall surface. In this example, a spring 66 surrounding stem 46 within housing 50 serves this purpose. This spring is compressed between valve plate 44 and a disc 67 slidably mounted on stem 46, said disc pressing a sealing ring 68 against a shoulder 69 formed in housing 50 or against one of the bearings 51 which projects a little beyond said shoulder towards hub 45. In this latter case, bearings 51 are preferably formed of a suitable lubricating material, such as carbon graphite.

In the preferred form of the invention, plate 44 is in the form of a disc having a periphery 72. In this case, flange or wall 19 has a circular inner surface 73 surrounding the periphery of the valve disc.

A control port 75 is formed in valve plate 44 to one side of axis 28. In this example, port 75 is located between wipers 60 and 61 on the side of axis 28 remote from boss 63. Control port 75 is adapted to be moved into and out of registry with entry and exit ports 30 and 32, and it is preferably larger than the entry port, as shown in FIGURE 4.

If desired, an air bleed valve 80 can be provided at the top of valve body 12, said valve being in communication with chamber 21 by means of a passage 82 of small diameter located at the top of said chamber.

When valve 10 is in use, pipes 35 and 37 are connected to circulating pipes of a water system. Stem 46 is rotated by manual means or power means, not shown. If the stem is rotated by an electric motor, the latter can be controlled by a thermostat in order to control the flow of hot water through the valve.

When valve 10 is closed, boss 63 of valve plate 44 is usually located over exit port 32. Spring 66 as well as the perssure of liquid in pipe 35 firmly keeps the boss against the inner surface of wall 24 so that the exit port is completely closed off. Thus, the pressure of the liquid helps to keep the valve closed. Wipers 60 and 61 keep the valve plate balanced or in its proper position within chamber 21 at this time. When stem 46 is rotated to open the valve, liquid will start to flow through exit port 32 as soon as boss 63 starts to uncover said port. The reason for this is that some liquid can travel from entrance port 30 around valve plate 44 and through the spaces 64 on face 58 between wipers 60 and 61 and boss 63. If the valve is used to control the flow of hot water, this slight flow of water will start to warm up the pipes, and this prevents rapid expansion of the pipes. As soon as control port 75 starts to overlap ports 30 and 32, the flow of water through the valve will increase, and it will continue to increase until the three ports are in full registry, then the water travels straight through the valve without obstruction. Continued turning of the stem and valve plates starts to reduce the flow of liquid through the valve until boss 63 completely covers exit port 32 to stop all movement of liquid through the valve.

As valve plate 44 rotates across the flow of liquid through the valve, the resistance to the turning action is at a minimum so that it does not require very much power to operate the valve regardless of the pressure of the liquid. The revolving action of valve 44, and the action of wipers 60 and 61 and boss 63 virtually eliminates the possibility of foreign material clogging or jamming the valve. Boss 63 acts as a wiper as plate 44 is rotated, and the edges of this boss and of wipers 60 and 61 scrape the inner surface of wall or projection 26. Projection 26 of wall 24 acts as a seat for wipers 60 and 61, and boss 63 of valve plate 44. Furthermore, liquid flowing through spaces 64 between these wipers tends to flush out the valve and keep foreign material from accumulating therein or getting between the face of the valve plate 44 and the inner surface of wall 24. Furthermore, any foreign particles entering through port 30 are subjected to a slicing action when control port 75 moves across the entry port. As port 30 is smaller than port 75, nothing large enough to plug port 75 can enter the valve. As the walls of chamber 21 are not constantly or directly exposed to the flow of water through the valve, there is no wire drawing effect.

It is preferable to make stem 46 a loose fit in hub 45, and as the stem is connected to the hub only by shear pin 47, valve plate 44 can accommodate itself to the effective inner surface of wall 24 even though said surface may not be truly perpendicular to axis 28.

Air bleed valve 80 can be opened in order to purge the system of air. As chamber 21 is located at the top of inclined pipes 35 and 37, it acts as a trap for air, and this can be removed by opening valve 80.

What I claim as my invention:

1. A revolving liquid valve comprising a chamber in a valve body and having first and second opposed spaced-apart walls, a valve plate rotatably mounted in said chamber and having opposite faces one of which slidably bears against said second wall, a stem connected to the valve plate at an axis of rotation thereof and extending out of the chamber through the first wall and through a seal, aligned entry and exit ports respectively in the first and second walls offset from said stem, a control port through the valve plate positioned to move into and out of registry with said entry and exit ports when the plate is rotated, and wipers projecting from said one face of the valve plate adjacent the control port and slidably bearing against said second wall, a first of said wipers extending across the plate at one side of the control port between the latter and said stem and a second of said wipers extending across the plate at the side of said control port remote from the first wiper.

2. A revolving liquid valve comprising a chamber in a valve body and having first and second opposed spaced-apart walls, a valve plate rotatably mounted in said chamber and having opposite faces one of which slidably bears against said second wall, a stem connected to the valve plate at an axis of rotation thereof and extending out of the chamber through the first wall and through a seal, aligned entry and exit ports respectively in the first and second walls offset from said stem, a control port through the valve plate positioned to move into and out of registry with said entry and exit ports when the plate is rotated, and a boss projecting from said one face of the valve plate and slidably bearing against said second wall, said boss moving over the exit port on rotation of the valve plate and being large enough completely to cover said exit port.

3. A valve as claimed in claim 2 including a housing connected to the outer surface of the first wall and extending away therefrom, said housing opening into the chamber, stop means in the housing spaced from said first wall, said stem extending through the housing and the stop means thereof, sealing means in the housing bearing against said stop means, a disc movably fitting in the housing, and a spring between said valve plate and said disc urging the former against said second wall and the latter against the stop means.

4. A valve as claimed in claim 2 including a housing connected to the outer surface of the first wall and extending away therefrom, said housing opening into the chamber, bearing means in the housing spaced from said first wall, a shoulder in housing between the first wall and the bearing means, said stem extending through the housing and the bearing means thereof, sealing means in the housing bearing against said shoulder, a disc movably fitting in the housing, and a spring between said valve plate and said disc urging the former against said second wall and the latter against the shoulder.

5. A valve as claimed in claim 2 in which the control port of the valve plate is larger than said entry port.

6. A valve as claimed in claim 2 in which said cover of the valve body is formed with a flat projection thereon fitting within said annular wall and against which said boss the valve plate bears.

7. A valve as claimed in claim 2 in which said one face of the valve disc includes wipers projecting therefrom adjacent the control port and slidably bearing against said second wall.

8. A valve as claimed in claim 2 including an inlet pipe connected to the valve body over the entry port and inclined away from said stem, and an outlet pipe connected to the valve body over the exit port and inclined away therefrom in substantially the same general plane as the inlet pipe.

9. A valve as claimed in claim 8 including an air bleed valve in communication with the chamber at the opposite side of the stem thereof from said inlet and outlet pipes.

10. A valve as claimed in claim 2 including a wiper projecting from and extending across said one face and spaced from the boss, said wiper slidably bearing against said second wall, said boss and wiper leaving clear spaces between said one face and said second wall.

11. A valve as claimed in claim 10 including resilient means bearing the valve plate to urge said boss and wiper against said second wall.

References Cited

UNITED STATES PATENTS

| | | | |
|---|---|---|---|
| 1,314,559 | 9/1919 | Wilson | 251—178 X |
| 1,813,100 | 7/1931 | Swindle | 251—208 X |
| 1,991,006 | 2/1935 | Wilson | 251—177 |
| 2,247,227 | 6/1941 | Findley | 251—208 |
| 2,267,064 | 12/1941 | Wikelund | 137—240 X |
| 2,443,929 | 6/1948 | Patterson | 137—243.2 |
| 2,582,752 | 1/1952 | Harr | 251—180 X |
| 3,059,893 | 10/1962 | Pursel | 137—243.2 X |

FOREIGN PATENTS 3,003    11/1863    Great Britain.

CLARENCE R. GORDON, Primary Examiner

U.S. Cl. X.R.

137—242; 251—180, 214